United States Patent
Melander

(10) Patent No.: US 7,587,623 B2
(45) Date of Patent: Sep. 8, 2009

(54) SYSTEMS AND METHODS FOR RECOVERING A TRADING SYSTEM

(75) Inventor: Magnus Melander, Arsta (SE)

(73) Assignee: Cinnober Financial Technology AB, Stockholm (SE)

( * ) Notice: Subject to any disclaimer, the term of this patent is extended or adjusted under 35 U.S.C. 154(b) by 489 days.

(21) Appl. No.: 11/118,782

(22) Filed: May 2, 2005

(65) Prior Publication Data

US 2006/0248126 A1 Nov. 2, 2006

(51) Int. Cl.
*G06F 11/00* (2006.01)
(52) U.S. Cl. .......................................................... 714/4
(58) Field of Classification Search ....................... 714/4
See application file for complete search history.

(56) References Cited

U.S. PATENT DOCUMENTS

| | | | |
|---|---|---|---|
| 4,665,520 A | 5/1987 | Strom et al. | |
| 4,853,843 A | 8/1989 | Ecklund | |
| 6,401,120 B1 | 6/2002 | Gamache et al. | |
| 2003/0074596 A1* | 4/2003 | Mashayekhi et al. | 714/4 |
| 2003/0217088 A1 | 11/2003 | Takamoto | |

OTHER PUBLICATIONS

S. E. Bratsberg et al., "Providing a highly available database by replication and online self-repair", Engineering Intelligent Systems vol. 4, No. 3: 131-139, Sep. 3, 1996.

\* cited by examiner

*Primary Examiner*—Scott T Baderman
*Assistant Examiner*—Jigar Patel
(74) *Attorney, Agent, or Firm*—Browdy and Neimark, P.L.L.C.

(57) ABSTRACT

The present invention relates to methods, a system, computer readable mediums and computer program products for recovering an application state of an electronic trading system including a first server and a second server after a fail of both of the servers, wherein the first server functions as a primary server for receiving incoming messages of the system and the second server as a secondary server during operation of the system, wherein each incoming message is processed in both servers. The method comprises the steps of: initiating a recovery procedure after a fail of both servers by restarting the first server and the second server; identifying the last message of respective server; and selecting a server as the primary server on basis of the latest messages.

16 Claims, 4 Drawing Sheets

SYSTEMS AND METHODS FOR RECOVERING A TRADING SYSTEM

TECHNICAL AREA

The present invention relates to electronic trading systems for trading stocks, bonds, futures, options and other financial instruments, and in particular to methods, systems, computer readable mediums and computer program products for such systems.

BACKGROUND OF THE INVENTION

During the last decade, almost all the world's exchanges and marketplaces have introduced electronic trading systems. These systems either replace the traditional trading floors or are used as complements to them. Today a large number of exchanges throughout the world utilizes electronic trading to trade stocks, bonds, futures, options and other financial instruments. These electronic exchanges are generally includes three basic components, namely mainframe computers (host), communication servers, and the exchanges participants computers (client). The host constitutes, so to speak, the heart of the electronic trading system. The hosts operations includes, for example, order-matching, maintaining order books and positions or price information. Participants, e.g. traders, are capable of communicating with the host by means of high speed data lines, high speed communications servers and the Internet. Thus, the traders can participate in the market by means of the clients communicating with the host.

In order to secure system availability, the exchangers system often uses two server placed in two geographically different spots interconnected via a network. One of the servers is considered being the primary server and the other consequently as the secondary. The system will be operational with only one server acting as primary, but will then, of course, not be redundant. The primary server will accept incoming messages, store them to disk in a log file and replicate the message to the secondary node or server. The two servers then perform the same business logic procedure based on the incoming message. This results in the two servers being synchronized and having the same application state, i.e. each transaction has the same state with respect to, for example, price or volume of a stock.

If the primary server fails for some reason, the secondary server is accordingly able to take over and take the role as primary node and accept incoming messages. On the other hand, if the secondary server fails for some reason, the primary server just continuous to operate. According to a more severe scenario both servers fail for some reason. In this case, the application state of the system will be restored using a recovery procedure. According to this recovery procedure, one of the servers is restarted and reads its log file and restore its application state based on the information contained in the log file. Thereafter, the second server is started. It will perform a so-called catch-up procedure including requesting all needed information from the first server to restore its application state to be synchronized with the first server. This information is sent over the network interconnecting the both servers. When all catch-up information has been received by the second server, it signals the first server informing it that it is now synchronized with the first server. The server pair is now regarded as fully functional and as a redundant server pair. The log file for a server can be large and the time required for a single server to read its log file and recover its state can take a long time, ranging from a few minutes up to several hours. In addition, when the second server requests the catch-up procedure, the load on the active server is increased and the may also be a significant amount of traffic in the network. Consequently, the load on the servers and the network may be significant during a recovery procedure.

Thus, there is need of an improved system and a method for recovering a trading system.

SUMMARY OF THE INVENTION

An object of the present invention is to provide an improved system and method for recovering a trading system when both a primary server and a secondary server has failed that reduces the load on the servers and the network interconnecting them.

These and other objects are achieved according to the present invention by providing a system, a method, a computer program, and a computer readable medium having the features defined in the independent claims. Preferred embodiments are defined in the dependent claims.

According to a first aspect of the present invention, there is provided a method for recovering an application state of an electronic trading system including a first server and a second server after a fail of both of the servers, wherein the first server functions as a primary server for receiving incoming messages of the system and the second server as a secondary server during operation of the system, wherein each incoming message is processed in both servers. The method comprises the steps of: initiating a recovery procedure after a fail of both servers by restarting the first server and the second server; identifying the last message of respective server; and selecting a server as the primary server on basis of the latest messages.

According to a second aspect of the present invention, there is provided a recovery system for recovering an application state of an electronic trading system including a first server and a second server after a fail of both of the servers, wherein the first server functions as a primary server for receiving incoming messages of the system and the second server as a secondary server during operation of the system, wherein each incoming message is processed in both servers. The system comprises means for initiating a recovery procedure after a fail of both servers by restarting the first server and the second server; means for identifying the last message of respective server; and means for selecting a server as the primary server on basis of the latest messages.

According to a third aspect of the present invention, there is provided a computer program product, which when executed on a computer, performs steps in accordance with the method of the first aspect.

According to a fourth aspect of the present invention, there is provided a computer readable medium comprising instructions for bringing a computer to perform the method according to the first aspect.

Thus, the invention is based on the idea of restarting both servers substantially simultaneously after a failure of both servers and selecting a server as the new primary server on basis of the last messages in respective server in a recovery procedure. According to the conventional technique, one of the servers is restarted and reads its log file and restore its application state based on the information contained in the log file. Thereafter, the second server is started and performs a catch-up procedure including requesting all needed information from the first server to restore its application state to be synchronized with the first server, which information is sent over the network interconnecting the both servers. This conventional recovery procedure is time consuming and entails a significant load on the active server and a frequent network traffic since, inter alia, the log file for a server can be large and the time required for a single server to read its log file and recover its state can take a long time, ranging from a few minutes up to several hours, and the catch-up procedure. Hence, the present invention discloses several advantages in comparison to the known technique. For example, the network traffic and the load on the servers can be reduced.

Preferably, the last message in respective server is identified by means of the respective sequence numbers of the log files. That is, the latest or highest sequence number in respective log file is identified. These sequence number is exchanged and compared in order to select the new primary server. The new secondary server only reads outstanding messages from the primary server, i.e. only messages missing in its own log file. Accordingly, the network traffic can be significantly reduced due to the fact that only outstanding messages are burden the network. Moreover, the load on the selected primary server is also reduced since only the outstanding messages are requested and not the complete log file.

As realized by the person skilled in the art, the methods of the present invention, as well as preferred embodiments thereof, are suitable to realize as a computer program or a computer readable medium.

These and other advantages with, and aspects of, the present invention will become apparent from the following detailed description and from the accompanying drawings.

SHORT DESCRIPTION OF THE DRAWINGS

In the following description of an embodiment of the invention, reference will be made to the accompanying drawings of which:

DETAILED DESCRIPTION OF THE INVENTION

Figure 1:
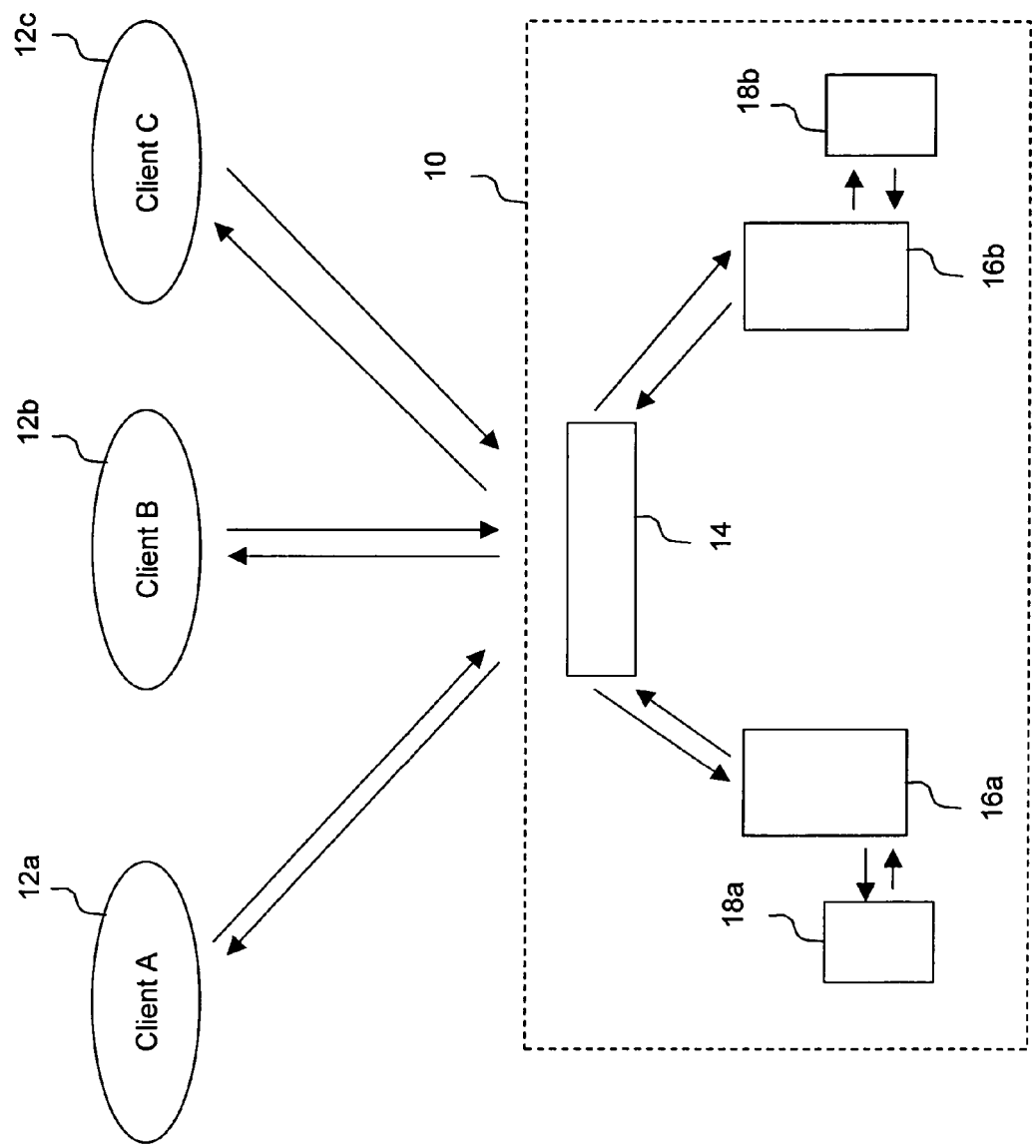
FIG. 1 is a general view of an electronic trading system.

In the following there will be discussed preferred embodiments of the methods and system for With reference first to FIG. 1, an electronic trading system in which the present invention can be implemented will be discussed. A number of clients, here indicated by client A 12a, client B 12b, and client C 12c, communicates with the trading or exchange system 10. Thus, traders can participate in the market by means of the clients 12a-12c communicating with the exchange system 10, i.e. the host. The clients 12a-12c may link to the system 10 via high speed data lines, high speed communication servers, or the Internet. High speed data lines establish direct connection between a client and the system. Connection can also be established between the client and the system by configuring high speed networks or communication servers at strategic access points in locations where traders physically are located. Internet is a third communication means enabling traders, using, for example, the clients 12a-12c, can communicate using, for example, high speed data lines connected to the Internet. Hence, trades are allowed to be located anywhere they can establish a connection to the Internet.

The system 10 comprises a gateway 14 arranged to receive incoming messages from the clients 12a-12c and distribute them to a server 16a acting as the primary node. In order to secure system availability, the exchange's system often uses two server placed in two geographically different spots interconnected via a network. One of the servers is considered being the primary server and the other consequently as the secondary. The system will be operational with only one server acting as primary, but will then, of course, not be redundant. The primary server 16a accepts incoming messages from transferred from the gateway 14, stores them in a storage means 18a in a log file. This storage means 18a may be of course be physically separated from the system 10 and the server 16a. Furthermore, the primary server 16a replicates the messages to the secondary node or server 16b, which, in turn, stores in a storage means 18b in a log file. This storage means 18b may be of course be physically separated from the system 10 and the server 16b. The two servers 16a, 16b perform the same business logic procedure based on the incoming message. This results in the two servers being synchronized and having the same application state. If the primary server fails for some reason, the secondary server is accordingly able to take over and take the role as primary node and accept incoming messages. On the other hand, if the secondary server fails for some reason, the primary server just continuous to operate. Each message is then processed in both servers 16a and 16b and a transaction reply is sent from the primary server 16a when the processing of the message has been completed.

Figure 2:
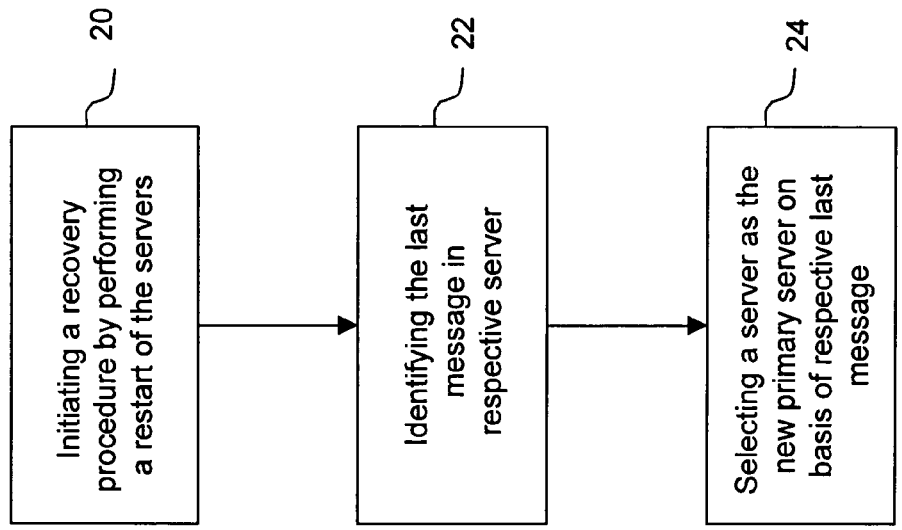
FIG. 2 shows schematically the general principles of the method for an electronic trading system according to the present invention.

Turning now to FIG. 2, the general principles of the method for recovering an application state of an electronic trading system after a fail of the primary and secondary server of the system according to the present invention will be discussed. The method according to the present invention is preferably implemented in a electronic trading system such as the system described with reference to FIG. 1. First, at step 20, a recovery procedure after a fail of both servers is initiated by performing a restart of the first server 16a and the second server 16b. At a restart command, respective server obtains a configuration file containing instructions for the servers, for example, an instruction to reads its log file, etc. The configuration file of a server may be stored on the storage means 18a and 18b, respectively, or at a separate server connected to both server 16a and 16b.

Then, at step 22, respective server 16a and 16b identifies the last message or transaction on file. Subsequently, at step 24, the server having the latest message on file is selected to be the new primary server. The selected primary server is now ready to start accepting incoming messages from the gateway 14, which may either the original primary server or the originally secondary server. When a server has been selected as primary server, its informs other units of the system, for example, the gateway 14 by means of multicast messaging of the event, i.e. that it has been selected as primary server.

Figure 3:
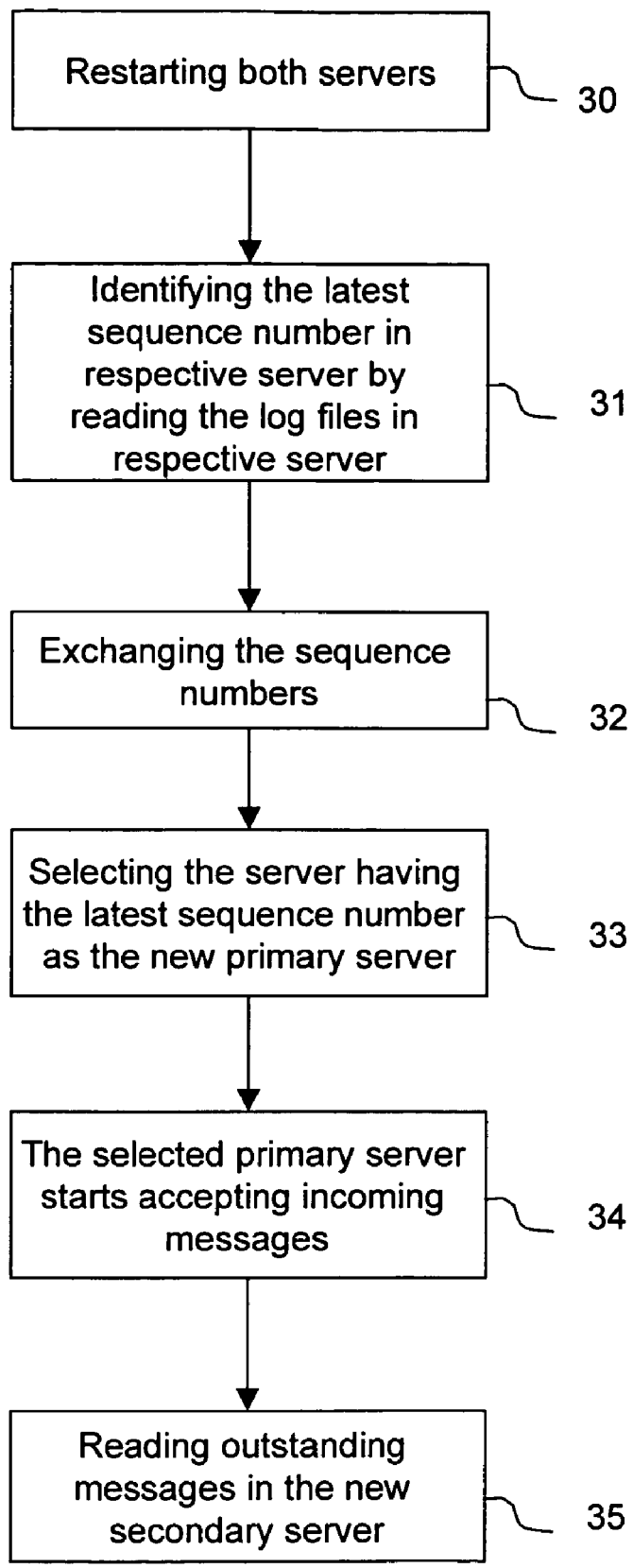
FIG. 3 shows schematically a first embodiment of the method according to the present invention.

With reference now to FIG. 3, an embodiment of the present invention will be discussed. First, at step 30, both servers 16a and 16, respectively, are restarted. Then, at step 31, respective server 16a and 16b obtains its respective log file from respective storage means 18a and 18b, and reads respective log file in order to recover the state present in the log file. The latest sequence number, i.e. the last message on file, is identified in respective server 16a and 16b. Thereafter, at step 32, the identified sequence number are exchanged between the servers 16a and 16b and compared in order to identify the latest or highest sequence number. Then, at step 33, the server having the highest sequence number will be considered as the primary server. Subsequently, at step 34, the selected primary server start accepting incoming messages from the gate 14 and, finally, at step 35, the new secondary server request outstanding messaged from the primary server.

When a server has been selected as primary server, it will inform other units of the system, for example, the gateway 14 by means of multicast messaging of the event, i.e. that it has been selected as primary server. For example, if server 16a has recovered its log file and the last message has a sequence number of 4711 and the corresponding sequence number of server 16b is 4401, server 16a is considered as being the primary server. Server 16b will now request the outstanding messages 4402-4711 from the server 16a in order to complete its file. When the secondary server 16b has received the outstanding messages which are sent over the network connecting the two servers, the server pair is regarded as fully functional and as a redundant server pair. Of course, as the man skilled in the art realizes, step 34 and step 35 can be performed substantially simultaneously. But, however, it is of great importance that the transaction traffic is resumed again as soon as possible after the interruption caused by the failure in operation of the servers. Hence, the system operates now in accordance with the procedure described with reference to FIG. 1.

Figure 4:
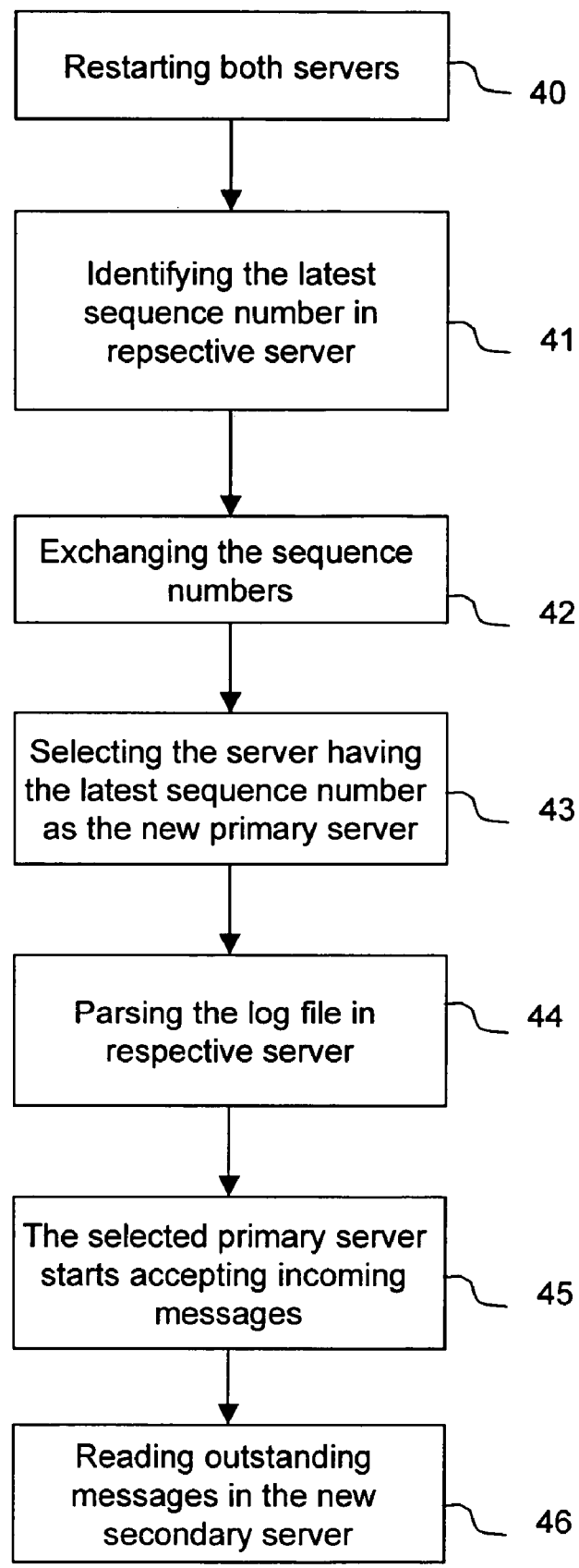
FIG. 4 shows schematically a second embodiment of the method according to the present invention.

Turning now to FIG. 4, another embodiment of the present invention will be discussed. First, at step 40, both servers 16a and 16, respectively, are restarted. Then, at step 41, respective server 16a and 16b obtains its respective log file from respective storage means 18a and 18b, and identifies the highest (last) sequence number of its log file. According to an alternative embodiment, the first sequence number and corresponding time stamp of respective log file is exchanged between the servers and if the time stamp are not identical, the recovery procedure is stopped since one or both of the servers have corrupt or incompatible log files. Thereafter, at step 42, the identified last sequence numbers of respective server 16a and 16b are exchanged between the servers, and, at step 43, the server having the highest sequence number is selected to be the primary server. Then, at step 44, respective log file is parsed in respective server 16a and 16b, respectively, and respective server 16a and 16b can recover to the saved application state, i.e. the application state respective server has before it failed. Then, at step 45, the selected primary server starts accepting incoming messaged from the gateway 14. When a server has been selected as primary server, it will inform other units of the system, for example, the gateway 14 by means of multicast messaging of the event, i.e. that it has been selected as primary server. Thus, the new primary server is now ready to start accepting incoming messages from the gateway 14, which may either the original primary server or the originally secondary server, and, finally, at step 46, the new secondary server request outstanding messaged from the primary server. When the secondary server has received the outstanding messages which are sent over the network connecting the two servers, the server pair is regarded as fully functional and as a redundant server pair. Of course, as the man skilled in the art realizes, step 45 and step 46 can be performed substantially simultaneously. But, however, it is of great importance that the transaction traffic is resumed again as soon as possible after the interruption caused by the failure in operation of the servers.

If both servers 16a and 16b, respectively, have the same sequence number, i.e. the highest sequence number in respective server is the same, the new primary server will be selected based on the information in the configuration file. The configuration file contains information of a preferred primary server and if the above mentioned scenario occurs, the preferred server is selected to be the new primary server.

Although specific embodiments have been shown and described herein for purposes of illustration and exemplification, it is understood by those of ordinary skill in the art that the specific embodiments shown and described may be substituted for a wide variety of alternative and/or equivalent implementations without departing from the scope of the invention. Those of ordinary skill in the art will readily appreciate that the present invention could be implemented in a wide variety of embodiments, including hardware and software implementations, or combinations thereof. This application is intended to cover any adaptations or variations of the preferred embodiments discussed herein. Consequently, the present invention is defined by the wording of the appended claims and equivalents thereof.

The invention claimed is:

1. A method for recovering an application state of an electronic trading system (10) including a first server (16a) and a second server (16b) after a failure of both of said servers, wherein said first server functions as a primary server for receiving incoming messages of said system and said second server functions as a secondary server during operation of said system, wherein each incoming message is processed in both servers, comprising the steps of:

initiating (20; 30; 40) a recovery procedure after a failure of both servers by substantially simultaneously restarting said first server and said second server;

after restarting, in each of the first and second servers, identifying (22) a last message of the first and second servers;

after identifying, exchanging information about the messages between the servers, the exchanged information comprising sequence numbers for uniquely identifying the messages;

comparing the sequence numbers, and selecting (24) the first server as the primary server when the comparison of said sequence numbers results in a determination that the first server has a message having a highest sequence number than the sequence number of the message of the second server, and selecting the second server as the primary server when the comparison results in a determination that the second server has a message having a highest sequence number than the sequence numbers of the message of the first server.

2. The method according to claim 1, wherein the step of identifying comprises the step of:

identifying (31; 41) the message having a highest sequence number in the first and second servers.

3. The method according to claim 1, further comprising the steps of:

after the step of selecting, ordering (34; 45) said selected primary server to accept incoming messages; and after the step of ordering, initiating (35; 46) a procedure in the other server to obtain a recovery of messages from said selected server.

4. The method according to claim 1, wherein the step of identifying comprises the steps of:

initiating (31) a reading procedure in said first and said second server, wherein said first and said second server reads a respective log file over received messages;

exchanging (32) a latest sequence number found in respective log file between said servers; and comparing (33) the sequence number of the last messages in the respective log files, wherein the server having a message with the latest sequence number is selected as the primary server.

5. The method according to claim 1, wherein the step of identifying comprises the steps of:

exchanging (42) a latest sequence number of the first and second servers between said servers; and comparing (43) the sequence numbers, wherein the server having a message with the latest sequence number is selected as the primary server.

6. The method according to claim 5, further comprising the steps of:
   identifying a respective first sequence number in each server and a corresponding time stamp;
   exchanging said first sequence numbers and said corresponding time stamps between said first and second severs;
   comparing said timestamps in order to determine whether said time stamps are identical; and
   if said time stamps are not identical, stopping said recovery procedure.

7. The method according to claim 5, further comprising the step of:
   initiating a reading procedure in said first and said second servers, wherein said first and said second server reads a respective log file over received messages.

8. A recovery system for recovering an application state of an electronic trading system (10) including a first server (16a) and a second server (16b) after a fail of both of said servers, wherein said first server functions as a primary server for receiving incoming messages of said system and said second server as a secondary server during operation of said system, wherein each incoming message is processed in both servers, comprising:
   means for initiating a recovery procedure after a failure of both servers by substantially simultaneously restarting said first server and said second server;
   means, provided in each of said first and second servers, for identifying a last message of the first and second servers after said first and second servers are restarted;
   means for exchanging information about the messages between the servers, the exchanged information comprising sequence numbers for uniquely identifying the messages;
   means for comparing the exchanged information; and
   means, responsive to said means for comparing, for selecting the first server as the primary server when the comparison of said sequence numbers results in a determination that the first server has a message having a highest sequence number than the sequence number of the message of the second server, and selecting the second server as the primary server when the comparison results in a determination that the second server has a message having a highest sequence number than the sequence number of the message of the first server.

9. The system according to claim 8, further comprising: means for identifying the message having the highest sequence number in respective server.

10. The system according to claim 8, further comprising:
    means, responsive to said means for selecting, for ordering said selected primary server to accept incoming messages; and
    means, responsive to said means for ordering, for initiating a procedure in the other server to obtain a recovery of messages of said selected server.

11. The system according to claim 8, further comprising:
    means for initiating a reading procedure in said first and said second servers, wherein each of said first and said second server reads a respective log file over received messages;
    means for exchanging a latest sequence number found in respective log file between said servers; and
    means for comparing the sequence number of the last message in respective log files, wherein said comparing means is configured to send an instruction to said selecting means instructing it to select the server having a message with the latest sequence number as the primary server.

12. The system according to claim 8, further comprising:
    means for exchanging a latest sequence number of the first and second servers between said servers; and
    means for comparing the sequence numbers, wherein said comparing means is configured to send an instruction to said selecting means instructing it to select the server having a message with the latest sequence number as the primary server.

13. The system according to claim 12, further comprising:
    means for identifying a respective first sequence number in each server and corresponding time stamps;
    means for exchanging said first sequence numbers and said corresponding time stamps between said first and second servers;
    means for comparing said timestamps in order to determine whether said time stamps are identical, wherein said comparing means is configured to send a stopping instruction to said initiating means instructing it to stop said recovery procedure if said time stamps are not identical.

14. The system according to claim 12, further comprising:
    means for initiating a reading procedure in said first and said second servers, wherein each of said first and said second server reads a respective log file over received messages.

15. A computer program product, embodied on a computer readable storage medium, which when executed on a computer, performs steps in accordance with claim 1.

16. A computer readable storage medium comprising instructions for bringing a computer to perform the method according to claim 1.

* * * * *